March 8, 1955  C. F. GRINER  2,703,511
MACHINE FOR MANUFACTURING IMPELLER WHEELS
Filed March 18, 1948   2 Sheets-Sheet 1
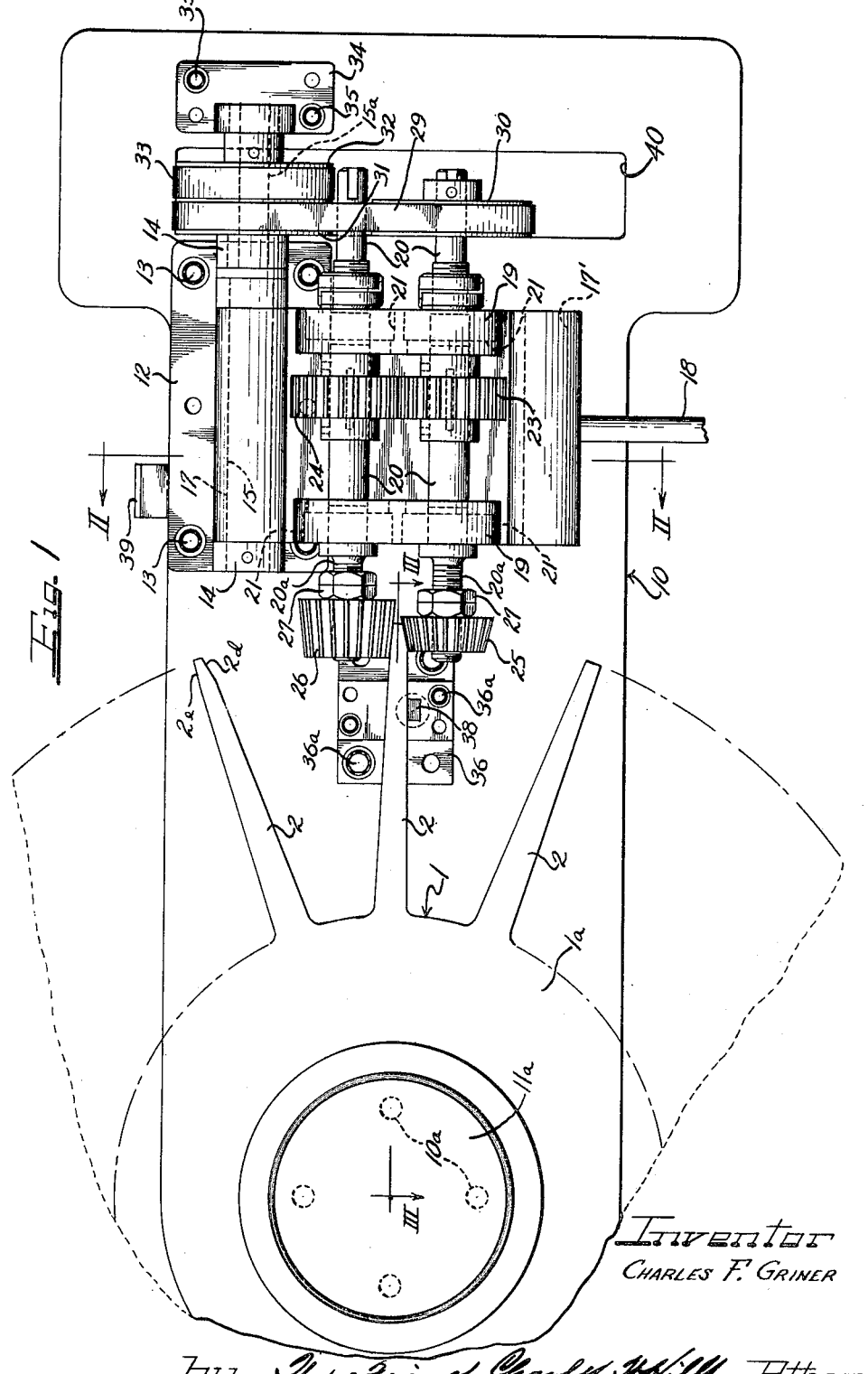
Inventor
CHARLES F. GRINER

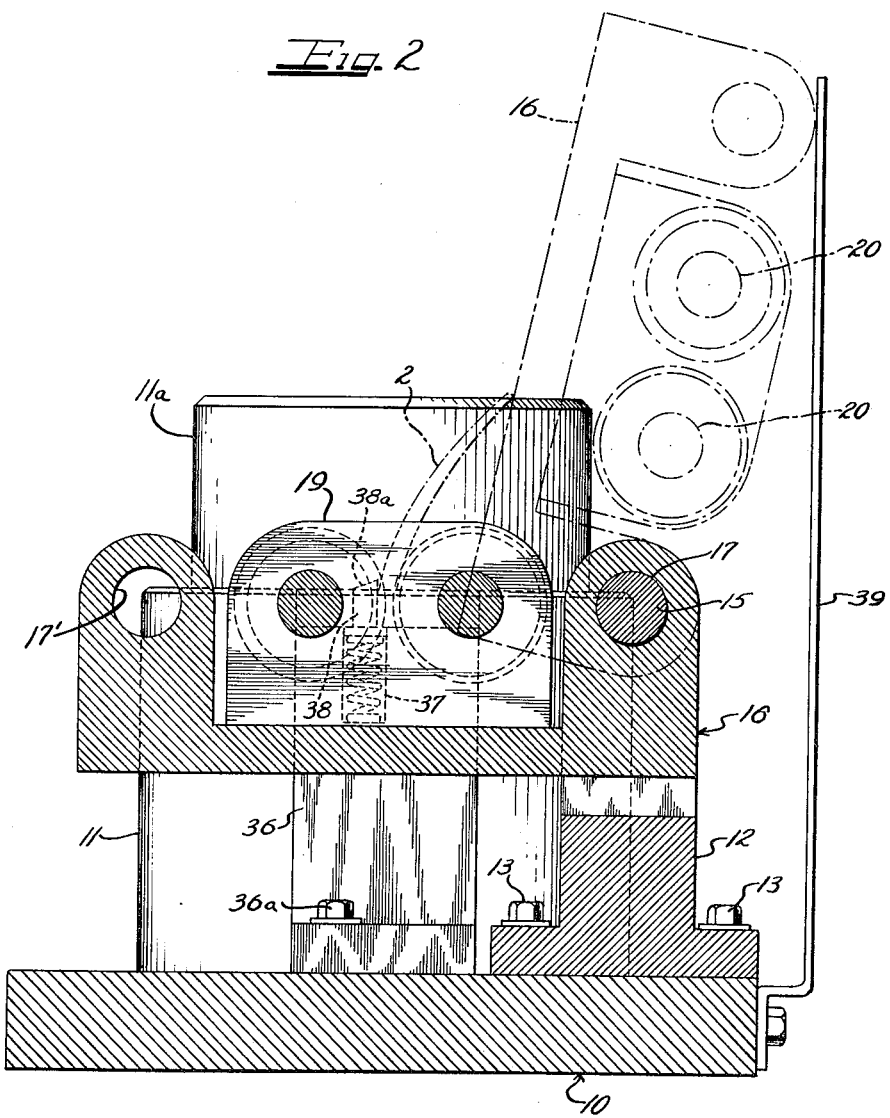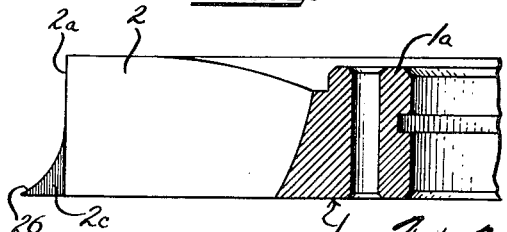

2,703,511
Patented Mar. 8, 1955

United States Patent Office

2,703,511

MACHINE FOR MANUFACTURING IMPELLER WHEELS

Charles F. Griner, Chagrin Falls, Ohio, assignor to Thompson Products, Inc., Cleveland, Ohio, a corporation of Ohio Application March 18, 1948, Serial No. 15,558

5 Claims. (Cl. 90—15)

This invention relates to an improved metal working machine and machining method, more particularly to a machine and method for rapidly, economically and accurately effecting the operation of thinning the blade end of the vanes of an impeller wheel.

In recent years the problem of mass production of impeller wheels of the type employed in aircraft engines has become a matter of substantial importance. As is well known, one common form of such impeller wheels comprises an integral array of circumferentially spaced, radially extending vanes emanating from a central hub portion. Each of such vanes are of relatively complex configuration, depending upon the operating characteristics for which the impeller is designed, but in all cases, the opposed faces of each of the vanes are of generally arcuate configuration as viewed in a plane perpendicular to the radial axis of the vanes.

In some impeller vane designs, particularly those impellers employing an outwardly tapering configuration of the axial vane edge, it has been found that a substantial improvement in the adiabatic characteristics of the impeller may be produced by thinning a portion of the vane end, particularly that portion which projects radially beyond the projected periphery of the small diameter end of the impeller. Optimum characteristics are obtained by a thinning operation which removes metal from both the leading and trailing faces of such vane ends.

Heretofore, it has been the practice to effect such thinning operations upon the vane ends by essentially manual operations. Obviously, such operations were not only costly and time consuming, but failed to reproduce the identical degree of thinning upon each of the successive vanes of an impeller, thus contributing to an overall dynamic unbalance of the impeller.

In accordance with this invention, an improved machine and method is supplied for efficiently and accurately accomplishing the aforedescribed blade thinning operation. The application of conventional machining methods to such an operation has not heretofore been completely successful, due to the fact that the machining is required to be produced at the unsupported end of a relatively long thin, and hence readily deformable, workpiece. Those skilled in this art will recognize that it is very difficult to adequately support any workpiece having as complex a configuration as an impeller vane so as to permit machining operations to be accurately performed upon the end of the impeller vanes. The method and machine provided by this invention completely overcomes such problem and effects the accurate machining of the vane ends of the impeller wheel without requiring any special supporting arrangement to be provided for such vane ends.

Accordingly, an object of this invention is to provide an improved machine and method for effecting cutting operations upon the unsupported ends of relatively long thin workpieces, such as the vanes of an impeller wheel.

A particular object of this invention is to provide an improved machine and method for performing a thinning operation upon the blade ends of an impeller wheel.

The specific nature of this invention, as well as other objects and advantages thereof will become apparent to those skilled in the art from the following detailed description of the annexed sheets of drawings which, by way of preferred example only, illustrate one specific embodiment of the invention.

On the drawings:
Figure 1 is a plan view of a milling machine embodying this invention showing such machine in cutting relationship with respect to a vane of an impeller wheel;

Figure 2 is an enlarged scale, sectional view taken on the plane II—II of Figure 1; and Figure 3 is a reduced scale, sectional view of the impeller wheel of Figure 1, being taken generally on the plane III—III thereof.

As shown on the drawings:

While not limited thereto, this invention finds particular applicability in the performing of machining operations upon the ends of the vanes of an impeller wheel indicated generally in the drawings by the numeral 1. As used herein, the term impeller is employed generally to designate any element having circumferentially spaced fluid guide vanes thereon, including, of course, turbine wheels and inducers. As will be recognized by those skilled in the art, such wheel comprises a hollow hub portion 1a on which are integrally formed a plurality of radially extending circumferentially spaced vane elements 2. Each of the vane elements is of complex cross-sectional configuration as is best indicated by the dotted line end view of a vane shown in Figure 2. In addition, the edge of each of the individual vane elements varies along the axial length of the vane from a small diameter end portion 2a to a large diameter end portion 2b. It has been found desirable that the portion 2c of the blade tip which projects radially beyond the small diameter end portion 2a be subjected to a thinning operation on both faces thereof, which operation contours such vane end portion as indicated respectively at 2d and 2e in Figure 1. For comparison purposes, the three vanes, shown in Figure 1, are, respectively in a counterclockwise direction, a vane element prior to the tip thinning operation, a vane element being subjected to the tip thinning operation, and lastly, a vane element after the tip thinning operation.

Heretofore, it has been practically impossible to effect such thinning operations by conventional rotary milling cutters or rotary grinders due to the difficulty involved in adequately supporting the vane end during the metal removing operation. In accordance with the method of this invention, this problem is completely overcome by concurrently operating upon opposite faces of the vane end respectively by separate metal removing cutters, grinders, or equivalent metal removing tools. In this manner, each of the rotary cutters provides adequate support of the other vane end for the other rotary cutter and, as a result, a completely accurate thinning operation may be rapidly effected upon each side of each vane end of the impeller.

Referring particularly to Figures 1 and 2 of the drawings, a machine embodying this invention is shown as comprising a base plate 10 upon which a pedestal support 11 is mounted in upstanding relationship and secured by bolts 10a. Pedestal support 11 has a reduced diameter top portion 11a which is dimensioned to fit snugly within the bore of an impeller wheel 1 which is to be subjected to the tip thinning operation. The wheel 1 may thus be readily circumferentially indexed about the hub portion 11 so as to successively position with respect to the base 10.

Adjacent one side of the base 10 and, in spaced relationship with respect to the pedestal 11, an upstanding bracket 12 is mounted as by bolts 13. Bracket 12 defines a pair of spaced bearings 14 which rotatably mount a shaft 15 with one end 15a of the shaft projecting beyond one of the bearings 14.

A bearing frame unit 16 is provided which may be conveniently formed as an integral casting and is provided with transverse aperture 17 at one end thereof for pivotally mounting the bearing frame 16 on the shaft 15 intermediate the bearings 14. At the other end of bearing frame 16, a manual operating handle 18 is detachably secured in any convenient manner so that the bearing frame 16 may be conveniently pivoted about the shaft 15 by manipulation of the handle 18.

At the central portion of the bearing frame 16, there are provided a pair of integral, spaced pedestals 19 which are suitably apertured so as to rotatably mount a pair of cutter spindles 20 in generally parallel relationship to each other and to the shaft 15. Suitable antifriction bearing units 21 may be incorporated within the bearing pedestals 19 to facilitate the antifriction journaling of the shaft 20. The cutter spindles or shafts 20 are interconnected for concurrent rotational movement by gears 23 and 24 respectively secured thereto and intermeshing with each other. The ends of the shaft 20 which project out of the bearing pedestals 19 toward the location of an impeller workpiece are threaded as indicated at 20a and thus permit rotary cutters 25 and 26 to be respectively secured to such threaded end portions and locked in any desired axial position thereon by lock nuts 27. While the rotary cutters 25 and 26 are specifically illustrated as comprising milling cutters, it will be understood that other forms of cutters or abrasive elements may be employed with equal facility, dependent only upon the amount of material that it is desired to remove from the blade ends of the impeller vanes or the surface finish desired. Furthermore, the cutters 25 and 26 have their cutting faces suitably shaped so as to conform to the desired configuration respectively of the opposed faces of the vane tips after the thinning operation. In the particular example illustrated, the cutter 25 is of frusto conical configuration as is the cutter 26, but the inclination of the cutting edge of cutter 25 is substantially greater than that of the cutter 26.

Furthermore, the cutter spindles 20 are so located relative to the pivotal mounting of the bearing frame 16 on the shaft 15 that the axis of shaft 15 corresponds substantially to the axis of curvature of the vane tips. This condition is best shown in Figure 2 wherein the cross-sectional configuration of a vane 2 with respect to the rotary cutters 26 and 27 is illustrated in dotted lines. It is not necessary that the axis of shaft 15 correspond exactly with the axis of curvature of the entire vane cross-section inasmuch as the tip thinning operation is generally performed only upon the radially projecting portion 2c of the vane edge and hence adequate clearance will be provided for the remainder of the vane edge merely by raising the bearing frame 16, hence the cutters 25 and 26, about the pivotal supporting axis defined by the shaft 15.

The spindles 20 are driven at a suitable speed for the cutting or abrading operation by a belt 29 which drives a pulley 30 on one of the shafts of one of the spindles 20 from a pulley 31 journalled on the projecting end portion 15a of the shaft 15. A second pulley 32 is also journalled on the projecting end portion 15a of shaft 15 and is secured to pulley 31. Pulley 32 connects by a belt 33 with any suitable source of motive power. Generally, an electric motor (not shown) is employed to drive the belt 33. The extreme end of projecting end portion 15a of the shaft 15 may be supported by an additional bearing pedestal unit 34 secured in upstanding relationship to the base 10 by bolts 35.

To facilitate the positioning of any particular vane 2 of the impeller 1 in proper relationship to have the opposite faces of the tip thereof concurrently engaged by the cutters 25 and 26, any suitable form of indexing device may be provided. For example, an upstanding bracket 36 may be mounted on the top of base 10, by bolts 36a which bracket defines a vertical aperture 37 in which is mounted a spring pressed indexing plunger 38. The top surface 38a of indexing plunger 38 is suitably sloped so that such plunger will be cammed downwardly by movement of an impeller vane thereacross in one direction but in the other direction, movement of the impeller vane will be prevented and the vane will be properly positioned for engagement by the rotary cutters 25 and 26.

In operation, the bearing frame 15 is initially moved to a substantially vertical position to rest against an upstanding stop arm 39. When in this position, an impeller 1 may be conveniently loaded onto the pedestal post 11 and one of the vanes 2 thereof properly positioned by indexing plunger 38. The motor (not shown) driving the rotary cutters 25 and 26 is then energized and the handle 18 is grasped to move the bearing frame 16 about its pivotal axis defined by the shaft 15, and thus move the rotary cutters 25 and 26 concurrently into engagement with opposite faces of the tip portion 2c of the vane 2. By such concurrent engagement of the rotary cutters with opposite faces of the vane tip, adequate support of the vane tip is provided by each of the cutters for the other and a smooth, highly accurate milling cut may be made on the vane tip along an arcuate path defined by the spacing of the axes of the rotary cutters with respect to the axis of the shaft 15. Upon the completion of the cut, the bearing frame 16 is pivoted to its upright position against the stop arm 39 and the impeller is indexed about the post portion 11a to bring the next vane 2 into position against the indexing plunger 38, hence in proper position for the next thinning operation. The rotary cutters 25 and 26 are, of course, separated by a distance such that the space between the contour defined between their cutting edges is exactly equal to the desired contour of the finished vane tip.

It should be particularly noted that the arcuate movement of the rotary cutters 25 and 26 about the axis of shaft 15 is accomplished without any interference with the driving of such rotary cutters and hence the speed of the cutters is maintained constant independently of the particular pivotal position of the bearing frame.

The described apparatus may also be employed on impeller wheels having vanes of reverse curvature to that shown. The bracket 12 is merely shifted to the opposite edge of base plate 10 and the bearing frame 16 mounted on shaft 15 by a second aperture 17' provided in the opposite side of the bearing frame. A slot 40 is provided in base plate 10 to permit free passage of belt 33 therethrough in either portion of the bearing frame.

From the foregoing description, it is apparent that this invention provides an improved method and machine for effecting a thinning operation upon the vane ends of impeller wheels or similar workpieces requiring metal removing operations to be performed on the ends of a long thin workpiece of complex configuration which cannot be conveniently supported in milling or grinding machines of conventional construction. The machine and method disclosed herein permits such operation to be performed rapidly and economically, and yet with a high degree of precision.

It will, of course, be understood that various details in construction or procedure may be modified through a wide range without departing from the principles of this invention and it is, therefore, not the purpose to limit the patent granted hereon otherwise than necessitated by the scope of the appended claims.

I claim as my invention:

1. Apparatus adapted for simultaneously milling the opposite faces of circumferentially spaced vanes radiating from the hub of an impeller wheel which comprises a base, a work support on said base adapted to receive the wheel hub snugly therearound to mount the wheel for rotation about a fixed axis, a bracket adapted to be selectively mounted on said base on opposite sides of said base, a pivot shaft carried by said bracket in a plane normal to the axis of the pedestal, a bearing frame having apertures at opposite ends thereof adapted to selectively receive the pivot shaft for swinging movement of the bearing frame about a fixed axis determined by the selected position for the bracket on the base, a pair of spindles rotatably mounted on said bearing frame, cutting tools carried by said spindles adapted to project into the spaces between vanes radiating from a wheel mounted on the pedestal, means for simultaneously driving said spindles, said cutting tools adapted to simultaneously mill opposite faces of a vane therebetween, and means for swinging the bearing frame about its selected pivotal axis for advancing the cutting tools across the faces of the vanes therebetween.

2. A machine for cutting opposed curved surfaces extending laterally across a vane type blade tip comprising, a pair of rotary cutters, a common support having bearing means for said cutters establishing separate rotational axes fixed with respect to one another, mounting means for a workpiece being operated on and for said common support, said mounting means being constructed to selectively position a curved vane type blade between said axes of said cutters and to pivotally carry said common support, said cutters together with said common support being pivotally movable through a curved cutting stroke laterally across the blade tip while concurrently engaging opposite faces of said blade, and means for rotating said cutters in unison.

3. A machine for simultaneously shaping opposed curved surfaces on blades of an impeller wheel, comprising, a pair of rotary cutters having axes fixed with respect to one another and providing opposed peripheral cutting edges for cutting the opposite faces of a curved impeller blade to a curved blade conformation by moving in unison laterally across the blade tip, means for simultaneously rotating said cutters, a common support for rotatably journalling said cutters on said fixed axes, and mounting means carrying said common support for pivotal movement and selectively stationarily positioning the impeller blade being operated on between said axes of said cutters to relatively move the cutters laterally across the blade tip through a curved cutting stroke while in cutting engagement with opposite faces of the blade.

4. A machine for cutting opposed curved surfaces extending laterally across a vane type blade tip comprising, a pair of rotary cutters, a common support having bearing means for said cutters establishing separate rotational axes fixed with respect to one another, mounting means for a workpiece being operated on and for said common support, said mounting means being constructed to selectively position a curved vane type blade between said axes of said cutters and to pivotally carry said common support, said cutters together with said common support being pivotally movable through a curved cutting stroke laterally across the blade tip while concurrently engaging opposite faces of said blade, and means for rotating said cutters in unison, said mounting means comprising an upstanding pedestal adapted to receive the hub of an impeller wheel of the type having a plurality of circumferentially spaced vane-type blades, and indexing means for selectively indexing the impeller wheel circumferentially to selectively position successive blades between said axes of said cutters.

5. A machine for cutting opposed curved surfaces extending laterally across a vane type blade tip comprising, a pair of rotary cutters, a common support having bearing means for said cutters establishing separate rotational axes fixed with respect to one another, mounting means for a workpiece being operated on and for said common support, said mounting means being constructed to selectively position a curved vane type blade between said axes of said cutters and to pivotally carry said common support, said cutters together with said common support being pivotally movable through a curved cutting stroke laterally across the blade tip while concurrently engaging opposite faces of said blade, and means for rotating said cutters in unison, said mounting means comprising an upstanding pedestal adapted to receive the hub of an impeller wheel of the type having a plurality of circumferentially spaced vane-type blades, indexing means for selectively indexing the impeller wheel circumferentially to selectively position successive blades between said axes of said cutters, and actuating means operatively connected to said common support to move said cutters through the cutting stroke.

References Cited in the file of this patent

UNITED STATES PATENTS

| Number | Name | Date |
| --- | --- | --- |
| 231,427 | Johnson | Aug. 24, 1880 |
| 1,277,891 | Evans | Sept. 3, 1918 |
| 1,698,909 | Currier | Jan. 15, 1929 |
| 2,035,810 | Hofmann | Mar. 31, 1936 |
| 2,213,251 | Lundberg et al. | Sept. 3, 1940 |
| 2,373,944 | Brown | Apr. 17, 1945 |
| 2,400,954 | Salstrom | May 28, 1946 |
| 2,428,301 | Surerus | Sept. 30, 1947 |
| 2,433,145 | Nord | Dec. 23, 1947 |